US008484360B2

(12) United States Patent
Cui et al.

(10) Patent No.: US 8,484,360 B2
(45) Date of Patent: Jul. 9, 2013

(54) METHOD AND SYSTEM FOR SEPARATING HTTP SESSION

(75) Inventors: Jie Cui, Beijing (CN); Bin Wang, Beijing (CN); Ming Jian Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 12/567,980

(22) Filed: Sep. 28, 2009

(65) Prior Publication Data
US 2010/0082823 A1 Apr. 1, 2010

(30) Foreign Application Priority Data

Sep. 28, 2008 (CN) .......................... 2008 1 0166021

(51) Int. Cl.
*G06F 15/16* (2006.01)
*G06F 15/173* (2006.01)
(52) U.S. Cl.
USPC ........... 709/228; 709/229; 709/238; 709/205; 709/218
(58) Field of Classification Search
USPC .......................................................... 709/228
See application file for complete search history.

(56) References Cited

U.S. PATENT DOCUMENTS

| 6,336,135 | B1 * | 1/2002 | Niblett et al. ................. 709/215 |
| 6,711,618 | B1 * | 3/2004 | Danner et al. ................. 709/228 |
| 7,039,049 | B1 * | 5/2006 | Akgun et al. ................. 370/389 |
| 7,318,238 | B2 | 1/2008 | Elvanoglu et al. |
| 7,600,230 | B2 * | 10/2009 | Desai et al. .................... 719/311 |
| 7,689,712 | B2 * | 3/2010 | Lee et al. ....................... 709/238 |
| 7,886,217 | B1 * | 2/2011 | Henzinger et al. ............. 715/205 |
| 8,261,272 | B2 * | 9/2012 | Yordanov ....................... 718/102 |
| 2001/0039586 | A1 * | 11/2001 | Primak et al. .................. 709/228 |
| 2003/0084282 | A1 * | 5/2003 | Taruguchi ....................... 713/155 |
| 2003/0110266 | A1 * | 6/2003 | Rollins et al. .................. 709/227 |
| 2004/0128547 | A1 * | 7/2004 | Laidlaw et al. ................ 713/201 |

(Continued)

FOREIGN PATENT DOCUMENTS

| EP | 1226698 | 7/2002 |
| WO | WO0244919 | 6/2002 |

OTHER PUBLICATIONS http://softwareas.com/cross-domain-communication-with-iframes, Software as She's Dev, Mahemoff's Podcast/Blog-Web. Programming, . . . Patterns' (AjaxPatterns.org) Mar. 21, 2008.

(Continued)

*Primary Examiner* — Richard G Keehn
(74) *Attorney, Agent, or Firm* — Jon A. Gibbons; Fleit Gibbons Gutman Bongini & Bianco PL

(57) ABSTRACT

A method and system for separating hypertext transfer protocol session. The method includes: detecting at the client a condition that a server is to be requested to instantiate same application during same hypertext transfer protocol session; obtaining from the server another hypertext transfer protocol session identifier corresponding to a service instance to be instantiated and setting the hypertext transfer protocol session identifier in the current session as a hypertext transfer protocol session identifier corresponding to a service instance that is to communicate with the server. The system includes: a session manager configured to detect a condition that a server will be requested to instantiate an application during a current HTTP session and a session agent configured to: (i) obtain from the server a second HTTP session identifier and (ii) set the second HTTP session identifier in the current session as a HTTP session identifier.

13 Claims, 7 Drawing Sheets

U.S. PATENT DOCUMENTS

| | | | | |
|---|---|---|---|---|
| 2004/0193699 A1* | 9/2004 | Heymann et al. | | 709/218 |
| 2004/0210536 A1 | 10/2004 | Gudelj et al. | | |
| 2006/0109795 A1* | 5/2006 | Kamata et al. | | 370/252 |
| 2006/0195545 A1* | 8/2006 | Kikkawa et al. | | 709/217 |
| 2007/0033092 A1* | 2/2007 | Iams | | 705/10 |
| 2007/0130253 A1* | 6/2007 | Newson et al. | | 709/203 |
| 2007/0136179 A1* | 6/2007 | Nguyen | | 705/37 |
| 2007/0142930 A1* | 6/2007 | Crisan et al. | | 700/17 |
| 2007/0233782 A1* | 10/2007 | Tali | | 709/203 |
| 2007/0234409 A1* | 10/2007 | Eisen | | 726/6 |
| 2008/0027809 A1* | 1/2008 | Storm | | 705/14 |
| 2008/0168139 A1* | 7/2008 | Junuzovic et al. | | 709/205 |
| 2008/0195740 A1* | 8/2008 | Lowell et al. | | 709/229 |
| 2008/0228926 A1* | 9/2008 | Shiratzky et al. | | 709/228 |
| 2008/0288583 A1* | 11/2008 | Agarwalla et al. | | 709/203 |
| 2009/0164613 A1* | 6/2009 | Saillet | | 709/223 |
| 2009/0259744 A1* | 10/2009 | Kolke et al. | | 709/224 |
| 2010/0088627 A1* | 4/2010 | Enkerud et al. | | 715/777 |

OTHER PUBLICATIONS

Stevend, "Beating the Browser's Ifram Security," http://www.elctech.com/blog/javascript-communication-between-2-iframes-from-different-domains, Nov. 2, 2006.

"Cross-domain AJAX," http://am.net/resources/javascript/CrossDomainAJAX.adpx, Nov. 2007.

* cited by examiner

| Component ID | URL | Session Cookies names | Session Cookies values |
|---|---|---|---|
| 01 | http://www.wds.com/saas1 | JSESSIONID | |
| 02 | http://www.wds.com/saas1 | JSESSIONID | |
| 03 | http://www.wds.com/saas1 | JSESSIONID | |

Fig.4a

| Name | Content | Host | Path |
|---|---|---|---|
| JSESSIONID | ... ... | wds.com | /saas1 |

Fig.4b

| Component ID | URL | Session Cookies names | Session Cookies values |
|---|---|---|---|
| 01 | http://www.wds.com/saas1 | JSESSIONID | 1122ddaabbcc |
| 02 | http://www.wds.com/saas1 | JSESSIONID | |
| 03 | http://www.wds.com/saas1 | JSESSIONID | |

Fig.4c

| Component ID | URL | Session Cookies names | Session Cookies values |
|---|---|---|---|
| 01 | http://www.wds.com/saas1 | JSESSIONID | 1122ddaabbcc |
| 02 | http://www.wds.com/saas1 | JSESSIONID | 2233ddbbccaa |
| 03 | http://www.wds.com/saas1 | JSESSIONID | |

Fig.4d

| Component ID | URL | Session Cookies names | Session Cookies values |
|---|---|---|---|
| 01 | http://www.wds.com/saas1 | JSESSIONID | 1122ddaabbcc |
| 02 | http://www.wds.com/saas1 | JSESSIONID | 2233ddbbccaa |
| 03 | http://www.wds.com/saas1 | JSESSIONID | 3344bbccaadd |

METHOD AND SYSTEM FOR SEPARATING HTTP SESSION

CROSS REFERENCE TO RELATED APPLICATION

This application claims priority under 35 U.S.C. 119 from Chinese Patent Application 200810166021.5, filed Sep. 28, 2008, the entire contents of which are incorporated herein by reference.

BACKGROUND OF THE INVENTION

1. Field of the Invention

The present invention relates to Hypertext Transfer Protocol (HTTP) sessions, and particularly relates to a method and system for separating HTTP sessions.

2. Description of Related Art

An HTTP protocol is a unilateral protocol. According to the HTTP protocol, a server can not initiate a connection to a client, but passively waits for and responds to a request from the client. Since the HTTP per se does not support storing state information of the client in the server, a state management mechanism, i.e. a session mechanism, is introduced to maintain state between the server and the client.

The introduction of session mechanism overcomes some limitations of HTTP, so the relationship between requests can be maintained at the client and the server. Based on the session mechanism, when the client first connects to the server, a HTTP session is established at the server where session-related variables are stored, and meanwhile a HTTP session identifier (ID) is generated to identify the variables of the session. Next, the server instructs a browser to generate a "Cookie" corresponding to the HTTP session. A Cookie is a small segment of text stored in the client by the server. During the session, each time a HTTP request is sent to the server through the browser, the session identifier contained in the Cookie is included in the HTTP request and further sent to the server, so the server can identify the session and obtain the session related variables.

However, typically in the prior art, a plurality of service instances corresponding to the same application may be required to run in a HTTP session. Under this circumstance, the plurality of service instances share the same HTTP session. At this point, a problem will arise.

FIG. 1 shows an example of an environment where a problem likely arises in the prior art. As shown in the figure, there are two servers in the example, one being a portal server 110, the other being a SaaS (Software as a Service) server such as an accounting application server 120.

A user may log in the portal network server 110 with his own user ID and password through a browser, and then enter page 100. The page 100 includes three user interface components, IFrame 101, IFrame 102 and IFrame 103. Since all of IFrame 101, IFrame 102 and IFrame 103 correspond to the same accounting application, their access points are identical. However, a service instance corresponding to IFrame 101 is main data of "A" company, a service instance corresponding to IFrame 102 is main data of "B" company, and a service instance corresponding to IFrame 103 is main data corresponding to "C" company.

The bottom left of FIG. 1, shows an example of Cookie 104 when the three IFrames are all opened. From the example it is seen that the Cookie 104 has two session IDs, i.e. JSESSIONID 105 and JSESSIONID 106. JSESSIONID 105 is in use when communicating with the portal server 110, and at the same time, variable information 111 corresponding to JSESSIONID 105 is saved in the portal server 110. JSESSIONID 106 is in use when communicating with the portal server 120, and at the same time, variable information 121 corresponding to JSESSIONID 106 is saved in the portal server 121.

According to the prior art, in this scenario there are three service instances corresponding to the accounting application, all of them using JSESSIONID 106 when communicating with the accounting application server 120. Since it is unable to distinguish which service instance is in use by means of the JSESSIONID 106, a problem arises. This is because, after the main data of "A" company is operated, the session variable stored at the accounting application server 120 is a value associated with "A" company, while after the main data of "B" company is operated, the session variable stored at the accounting application server 120 may be associated with "B" company. Thus, after the main data of "B" company is operated, what is shown when returning to look up the main data of "A" company may possibly be the main data associated with "B" company, which causes great confusion and may further result in data error.

In some applications, a mechanism is specially designed to avoid such problem by forbidding the operation when a plurality of service instances are detected trying to require instantiating a same application during the same HTTP session. In other words, if one wants to handle data of another company, the current HTTP session has to be closed so as to re-connect to the server. Though problems of data confusion and data error are avoided by this solution, it is very bothersome and not user-friendly. Thus, this solution can not fundamentally satisfy business needs.

There is another solution that only guarantees the correctness of the data of the service instance which is latest accessed. This solution is simple, but the user can not look up main data of previous application instances, which still brings great inconvenience to users.

Though FIG. 1 shows an environment in which the accounting application server and the portal server are located in the same domain, in fact, these problems also exist in an environment that the accounting application server and the portal server are in different domains.

SUMMARY OF THE INVENTION

According to an aspect of the present invention, there is provided a method for separating hypertext transfer protocol session. The method includes the steps of: detecting at the client an event that includes a request to the server to instantiate an application during a current HTTP session that is the same as an application previously instantiated during the same session, said HTTP session having a first HTTP session identifier; obtaining from the server a second HTTP session identifier; and setting the second HTTP session identifier in the current session as a HTTP session identifier corresponding to a service instance that is to communicate with the server.

In another aspect of the present invention, a system for separating hypertext transfer protocol session includes: a session manager configured to detect that a server will be requested to instantiate an application during a current HTTP session that is the same as an application previously requested during the same session, wherein said current HTTP session has a first HTTP session identifier; and a session agent configured to obtain from the server, in response to said detection, a second HTTP session identifier corresponding to a service instance to be instantiated, and for setting the second HTTP session identifier in the current session as a HTTP session identifier corresponding to a service instance that is to communicate with the server.

The method and system of the present invention avoid various problems such as data confusion, data error and user inconvenience that arise in the prior art when running a plurality of service instances of the same application during the same hypertext transfer protocol session.

BRIEF DESCRIPTION OF THE DRAWINGS

The above and other aspects will become apparent from the following detailed description of embodiments of the present invention, which is taken in conjunction with the accompanying drawings. Like reference numerals are used to indicate like or similar components throughout the accompanying drawings, in which:

FIGS. 4*a*-4*e* shows an example of Cookie and children session information table during communication between a browser instance and a server;

FIG. 5 schematically shows a block diagram of a system for separating HTTP Session according to an embodiment of the present invention.

DETAILED DESCRIPTION OF THE PREFERRED EMBODIMENTS

Hereinafter, a detailed description is given of a method and system for separating HTTP session as provided by the present invention with reference to the accompanying drawings by way of embodiments.

Figure 2:
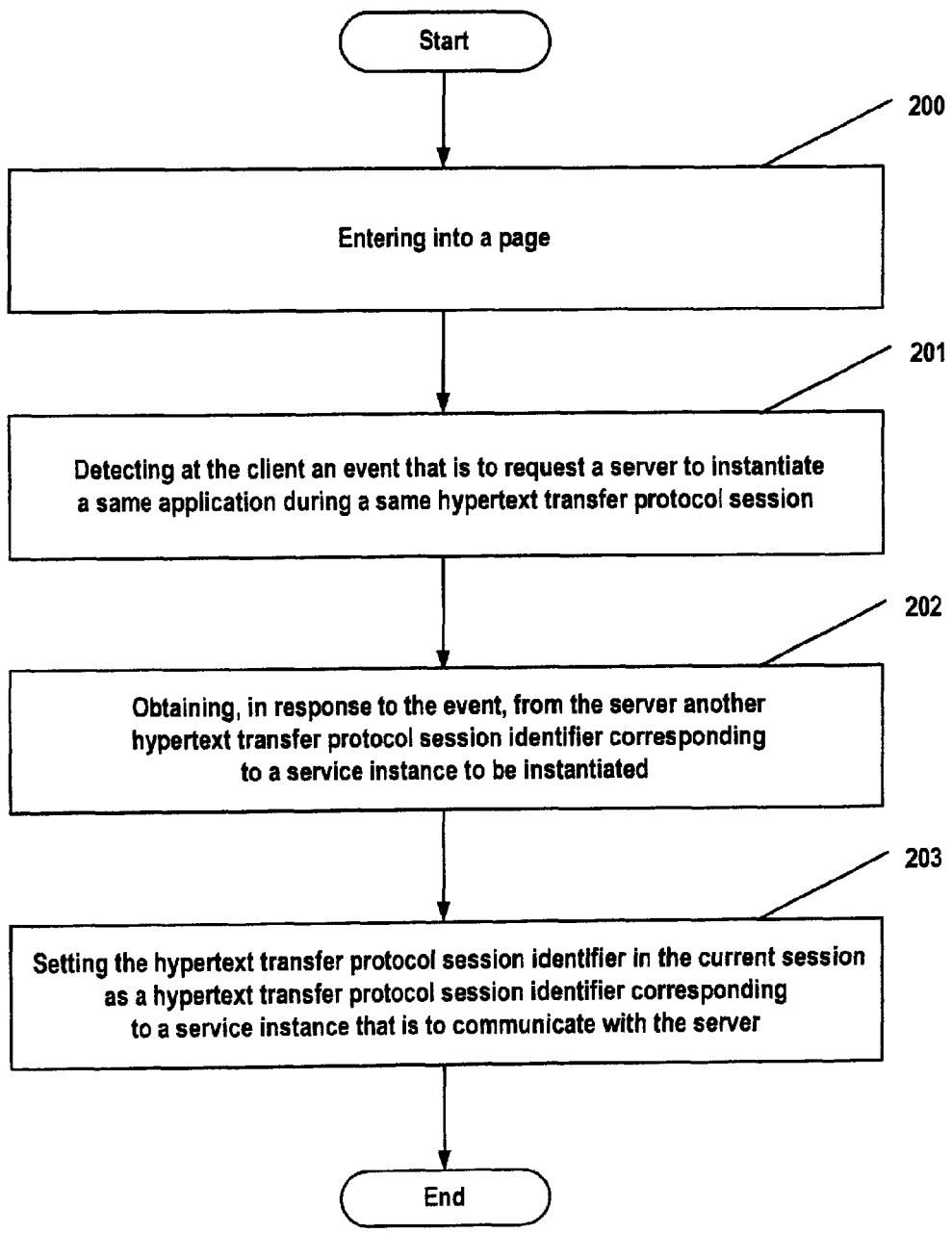
FIG. 2 schematically shows a flow chart of a method for separating HTTP Session according to an embodiment of the present invention.

FIG. 2 shows a flow chart of a method for separating HTTP session according to an embodiment of the present invention according to an embodiment of the present invention. In the following, the method of the present invention is first described with reference to FIG. 2 and FIG. 3*a*.

Figure 1:
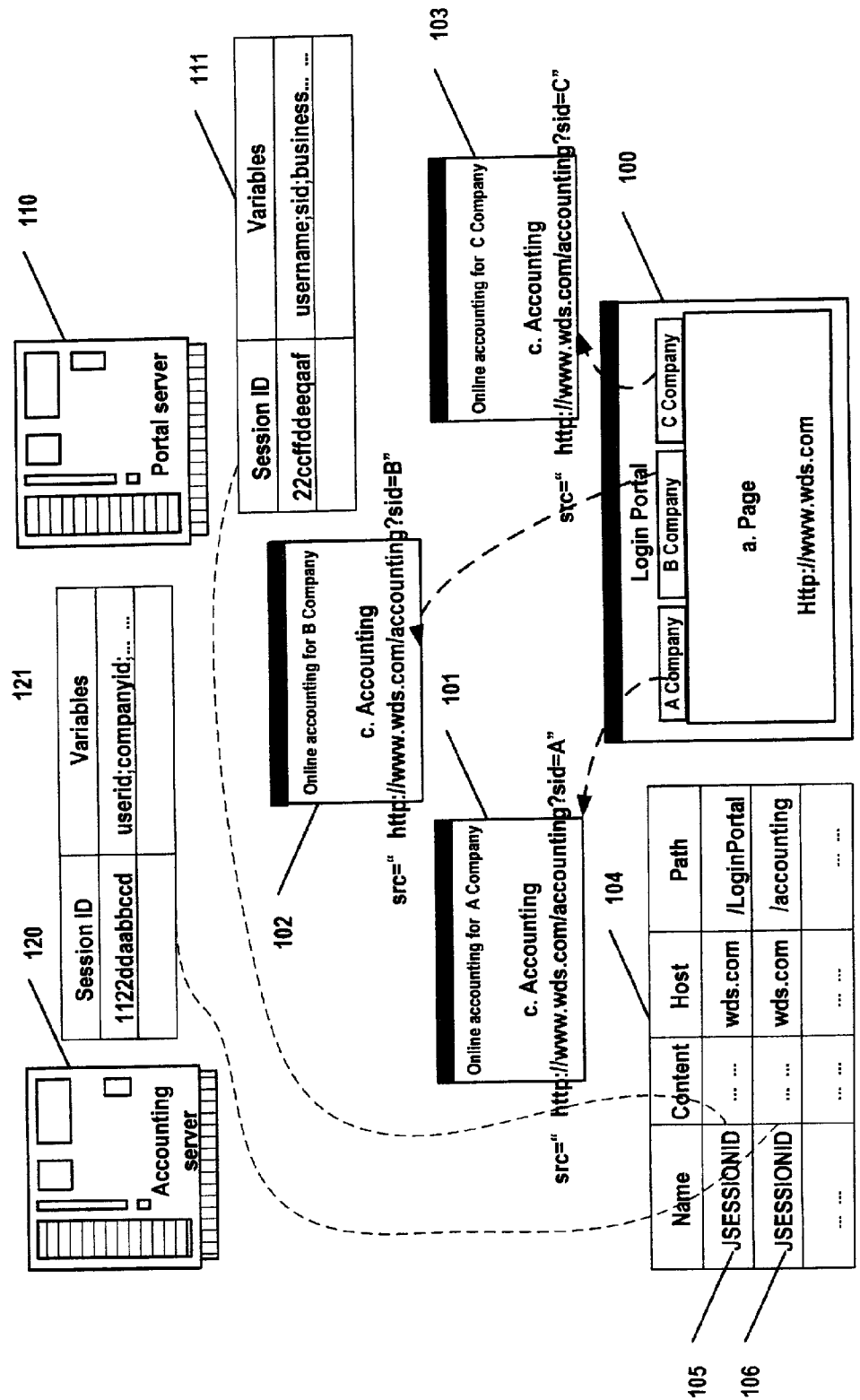
FIG. 1 shows an example of an environment where problem likely arises in the prior art.

Referring to FIG. 2, first at step 200, a page is entered. For further details of the step, reference is made to block 300 and block 310 in FIG. 3*a*. First, a user logs onto a portal network server 310 with his own user ID and password, and then enters a page 300 including several IFrames. Similar to the scenario shown in FIG. 1, the page 300 includes an IFrame 1, an IFrame 2 and an IFrame 3 (not shown), the component IDs of which are respectively "01", "02" and "03". Service instance 1, service instance 2 and service instance 3 that correspond to the IFrame 1, IFrame 2 and IFrame 3 are respectively for example, main data of A company with "SID=01", main data of B company with "SID=02", and main data of C company with "SID=03".

Further, a session manager 330 is included in the page 300. The session manager 330 may parse an application URL and establish or initialize a children session information table based on the parsed application URL, as shown in FIG. 4*a*, for storing a session identifier sequentially obtained by separating the HTTP session. The table 410 may for example include a component ID, a URL (Uniform Resource Locator) and session Cookie names and session Cookie values, etc. Since the page includes three IFrames corresponding to the same application, the table will have three records 411, 412 and 413. It should be noted that the table is only exemplary, and the present invention is not limited to this.

Next, returning to FIG. 2, at step 201, an event that will result in a request to the server to instantiate the same application in the same HTTP session is detected at the client.

Figure 3A:
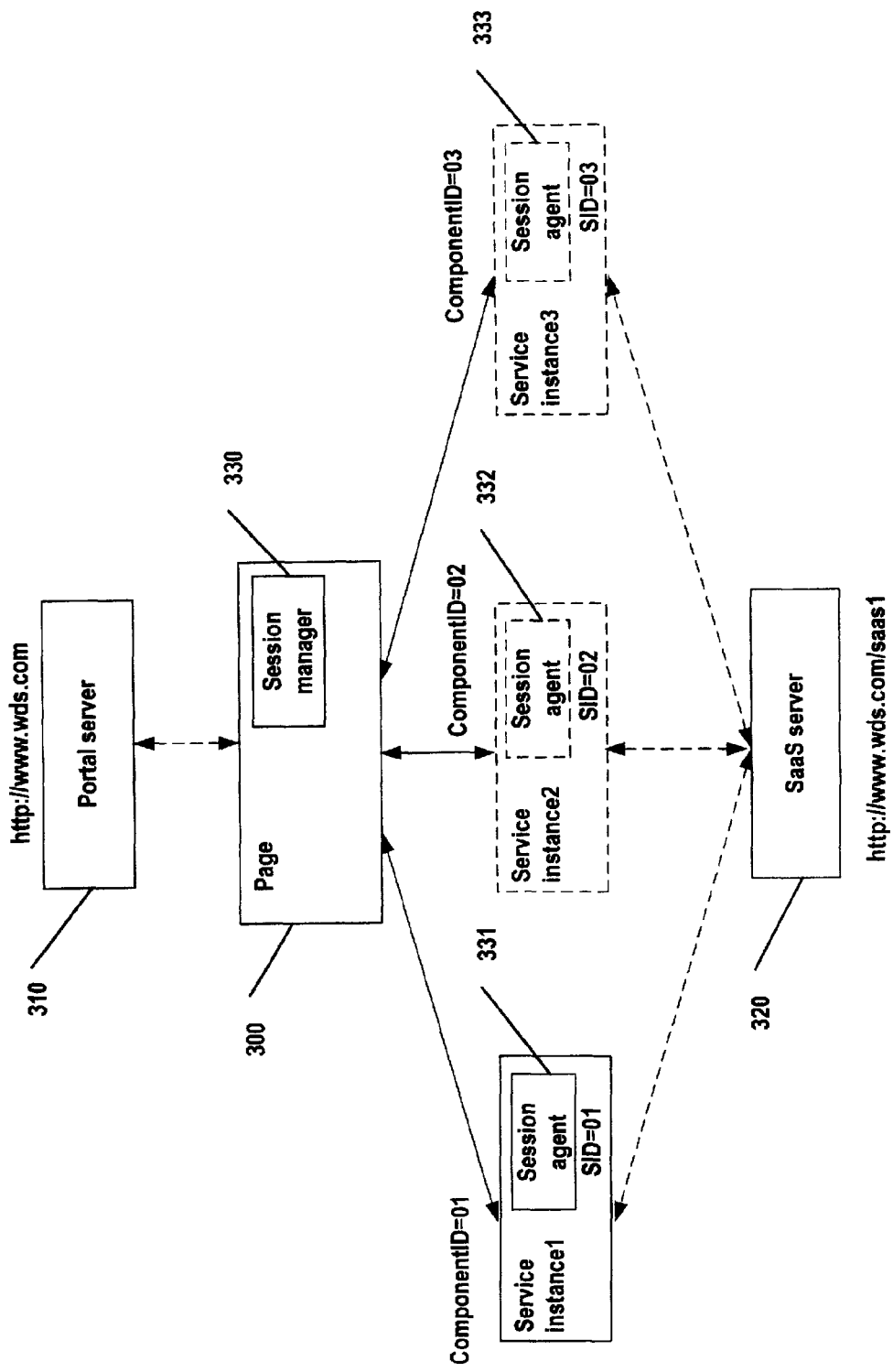
FIG. 3*a* schematically shows a process of instantiating a first, a second and a third service instances that correspond to a same application according to an embodiment of the present invention.

Referring to FIG. 3*a*, the session manager 330 included in the page 300 detects, for example by monitoring an event of requesting to newly open an IFrame, the event that is to request the server to instantiate the same application in the same HTTP session.

As shown in FIG. 3*a*, when the user requests to open IFrame 1 corresponding to the service instance 1, the session manager may detect that now there is not any HTTP session with the SaaS server. Thus, a browser instance sends a HTTP request to the SaaS server 320. In response to the request, the SaaS server 320 generates a HTTP session ID, for example "1122ddaabbcc", and meanwhile saves variables related to the session at the server. The SaaS server 320 also instructs the browser instance to generate at the client a Cookie corresponding to the HTTP session ID by including a line of special instructions in the header of the HTTP response, for example as shown in table 420 of FIG. 4*b*, the information 422 in the table is just the session ID "1122ddaabbcc" corresponding to the service instance 1. It should be noted that, for the sake of clarity, table 420 only shows cookie information 421 related to the SaaS server 320, without showing cookie information related to the portal server 310.

After obtaining a HTTP session ID, a session agent 331 will register the HTTP session identifier as information 414 with the session information table 410, thereby obtaining a children session information table 410 as shown in FIG. 4*c*.

For example, when requesting to open the IFrame corresponding to the service instance 2, the session manager may determine that it is to use the current HTTP session ID (i.e. "1122ddaabbcc") to request the SaaS server to instantiate the service instance 2, and the HTTP session is needed to separate according to the method of the present invention at this point, which is also a proper timing for separating the HTTP session.

Returning to FIG. 2, at step 202, in response to the event, another HTTP session ID, which corresponds to a service instance to be instantiated, is obtained from the server.

After obtaining a proper timing of separating the HTTP session, the session manager 330 may instruct the session agent 331 to obtain the another HTTP session identifier that corresponds to the service instance 2 to be instantiated.

As shown in FIG. 3*a*, in an embodiment of the present invention, when detecting an event that is to request to instantiate the same application in the same HTTP session, for example, it is to run service instance 2 when the service instance 1 has been run, the session manager 330 may instruct the session agent 331 in the service instance 1 to modify the current HTTP session ID in the Cookie, i.e. information 422 in table 420, such that SaaS server 320 takes the HTTP request sent thereto as a new request and generates a new HTTP session ID. The modification may be implemented by deleting the HTTP session ID in the Cookie, or alternatively, by replacing the HTTP session ID in the Cookie with a value unidentifiable to the SaaS server, for example a randomly generated value.

Since SaaS server 320 can not identify the HTTP session identifier included in the HTTP request, SaaS server 320 instructs, in the HTTP response, the browser instance to generate a Cookie corresponding to the newly generated HTTP session ID. The newly generated Cookie replaces the original Cookie. The newly generated Cookie is similar to the original Cookie, except that what is included in the newly generated Cookie is the newly generated HTTP session ID.

Next, similar to the scenario of instantiating the service instance 1, the newly generated HTTP session identifier (for example, "2233ddbbccaa") may be registered with the session information table 410 through the session agent 332 included in the instantiated service instance 2, which results in the children session information table 410 as shown in FIG. 4d. Besides, the newly generated HTTP session identifier may be taken out from the cookie by an existing other session agent and registered with the session manager 330, for service instances 1-3 belong to the same domain, and the browser allows the operation of amending Cookie in the same domain.

Likewise, when requesting to open the IFrame 3 corresponding to the service instance 3, the session manager 330 instructs the session agent 331 or session agent 332 to modify the Cookie. Next, similar to the scenario of requesting to instantiate service instance 2, the HTTP session ID corresponding to the service instance 3 may be obtained, for example "3344bbccaadd".

Figures 4E, 5:
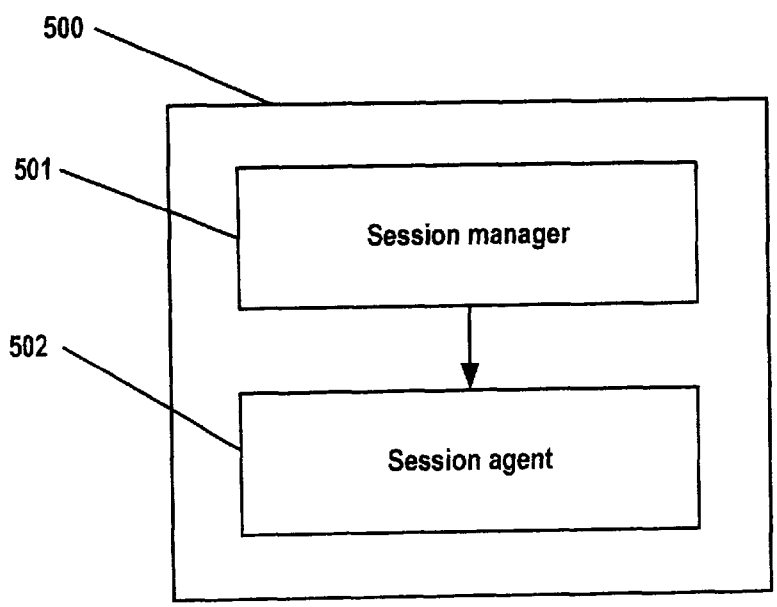

Next, the newly obtained HTTP session ID (for example, "3344bbccaadd") may be registered with the information table 410 by any of the session agent 331, session agent 332 and session agent 333, which results in the session information table 410 as shown in FIG. 4e.

In this way, three session IDs respectively for service instance 1, service instance 2 and service instance 3 are obtained.

Returning to FIG. 2, at step 203, the HTTP session ID in the Cookie is set to the HTTP session ID corresponding to the service instance that is to communicate with the server.

The session manager 330 may detect an event that another service instance is to communicate with SaaS server 320 by detecting the switch of the IFrame corresponding to a service instance, thereby obtaining the proper timing for setting the session ID.

Figure 3B:
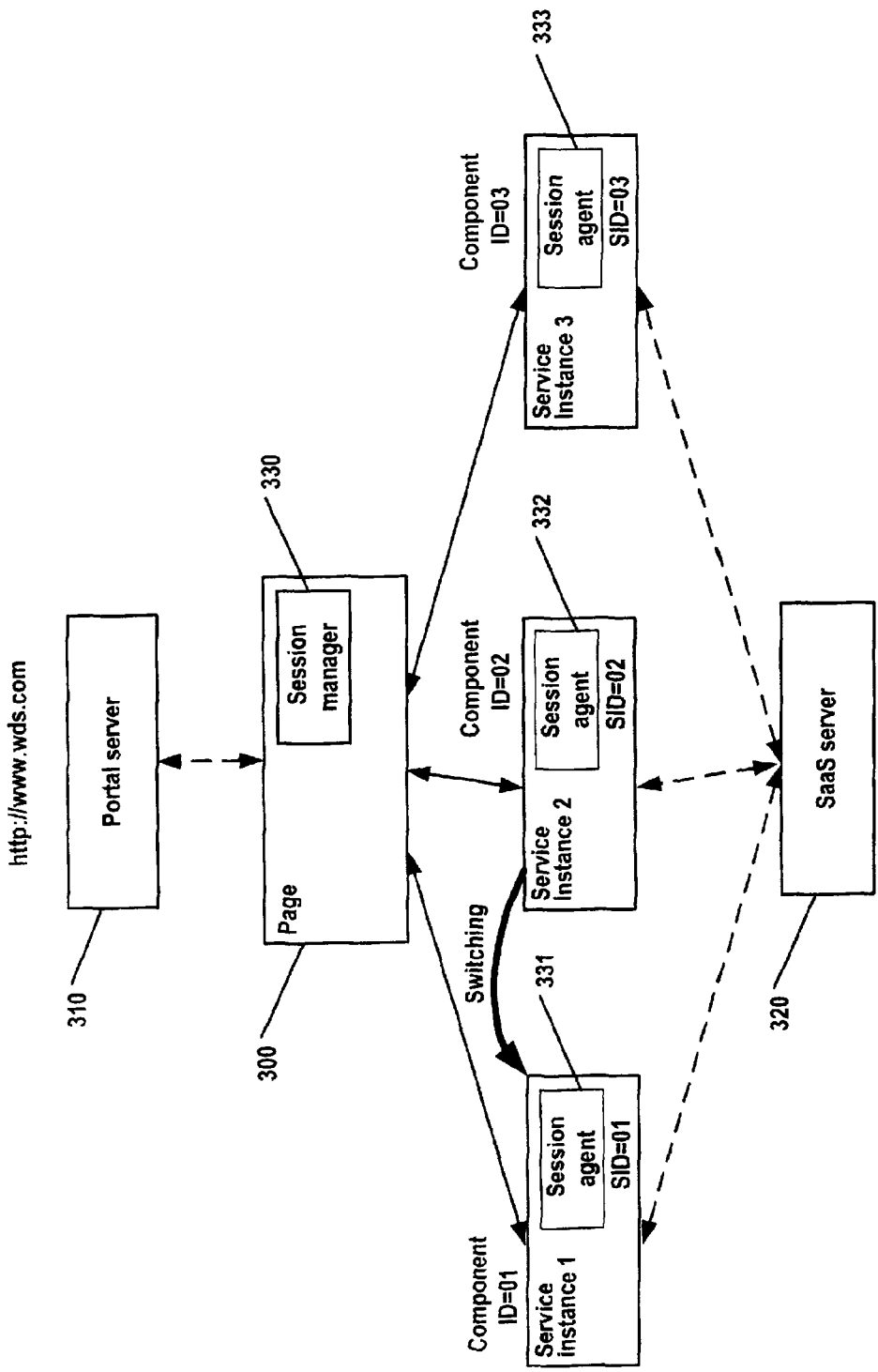
FIG. 3*b* schematically shows a process of switching between the three service instances that correspond to the same application according to an embodiment of the present invention.

As shown in FIG. 3b, when the session manager 330 detects that it is to switch from the service instance 2 to service instance 1, it utilizes the component ID "01" corresponding to service instance 1 as the key word to retrieve the corresponding HTTP session ID "1122ddaabbcc" from the children session information table 410 (as shown in FIG. 4e) which it maintains.

Next, the session manager 330 sends the HTTP session ID to the session agent 331 included in the service instance 1. After receiving the HTTP session ID sent from the session manager 330, the session agent 331 sets, based on the instruction, the HTTP session ID in the Cookie as the retrieved HTTP session ID "1122ddaabbcc".

Besides, since service instance 1, service instance 2 and service instance 3 belong to the same domain, the HTTP session ID in the Cookie may be set by any of session agent included in them.

In this way, when communicating with the SaaS server, the browser instance automatically includes the corresponding HTTP session ID in the HTTP request, such that the SaaS server 320 may identify the session variables corresponding to the service instance 2 and provide correct data to the service instance 2.

It should be noted that in the above embodiments described with reference to FIGS. 2-4, the SaaS server 320 and the portal server 310 are in the same domain. Thus, a session agent may also be included in the page 300, for setting and modifying the HTTP session ID in the Cookie for all the service instances; or the session manager 330 may include a function of the session agent.

Further, the present invention may likewise be implemented when the SaaS server and the portal server do not belong to the same domain. In this case, cross-domain communication is needed between the session manager 300 included in the page and the session agents 331, 332 and 332, which may be implemented by the cross-domain communication technology. The cross-domain communication is known in the prior art, thus detailed description thereof is omitted for the sake of clarity.

It should be noted that though the above embodiments are described in conjunction with the Cookies technology, the present invention is not limited thereto. The HTTP session technology may also be implemented by other techniques, for example, by adding and disposing a parameter, i.e. session id, behind each URL address, which falls within the scope of the present invention.

Besides, though in the above embodiment, the present invention is described in conjunction with SaaS application, it is only for exemplary purposes, and the present invention is not limited to this. The application of the present invention may be any proper application, for example, a typical network application such as email application and online bank application, etc.

Besides, though in the above embodiments, the application of the present invention in the scenario of one browser instance is described, it should be construed as a limitation to the present invention. In fact, the present invention is applicable in any environment of a plurality of service instances requiring running the same application in one HTTP session, not limited to the circumstance of a single browser instance. If the browser is designed as a plurality of browser instances sharing the same HTTP session, the present application is still applicable.

Besides, though in the above embodiments, the present invention is described in detail in conjunction with IFrame, it is only for illustrative purposes. In fact, the present invention is not limited to IFrame; it may also be applicable to any suitable environment with user interface components such as a tab, etc.

Further, it should be noted that though in the above embodiments the method of the present invention is described with particular sequences of steps it should not be construed as limitation to the present invention. For example, in a case first instantiating the first service instance 1 and the service instance 2, then switching to the service instance 1, and next instantiating the service instance 3, it is allowed to implement steps 201 and 201 after implementing steps 201, 202 and 203.

Besides, in the above embodiments, though the session manager collectively manages the session IDs of all children Session, the present invention is not limited to this. The session agent of respective service instance may save its own session ID, and in response to the instruction of the service manager, modifies the HTTP session ID in the Cookie as its own HTTP session ID.

In light of the method of the present invention, separation of HTTP session in the prior art is realized by requesting to the server a plurality of HTTP session IDs for a plurality of service instances of the same application, thereby obtaining children session corresponding to each service instance. When communicating with the server, each service instance utilizes a HTTP children session corresponding thereto so that the server is able to identify respective service instance through respective HTTP session ID, which further guarantees the correctness of data and avoids confusion in the prior art. Besides, the method is transparent to the user, and thereby brings better user experience and satisfies business needs in a better way.

Hereinafter, the system of the present invention is described with reference to FIG. 5. FIG. 5 shows a system for separating HTTP Session according to an embodiment of the present invention.

As shown in FIG. 5, a system 500 includes a session manager 501 for detecting an event that is to request a server to instantiate a same application during a same HTTP session; a session agent 502, for obtaining, in response to the event, from the server another HTTP session identifier corresponding to a service instance to be instantiated, and for setting the HTTP session identifier in the current session as a HTTP session identifier corresponding to a service instance that is to communicate with the server.

In an embodiment of the present invention, the session agent 502 is for modifying the HTTP session identifier in the current session when it is requested to instantiate the same application, such that the server generates the another HTTP session identifier for the service instance to be instantiated.

In another embodiment of the present invention, the session agent 502 implements the modification by deleting the HTTP session identifier in the Cookie.

In a further embodiment of the present invention, the session agent 502 implements the modification by replacing the HTTP session identifier in the current session with a value unidentifiable to the server.

In a still further embodiment, the session manager 501 is for: detecting an event that another service instance is to communicate with the server; and for retrieving, in response to the event, a HTTP session identifier corresponding to the another service instance, wherein the session agent 502 is for setting the HTTP session identifier in the current session as the retrieved HTTP session identifier.

In another embodiment of the present invention, the hypertext transfer protocol session identifier in the current session is a hypertext transfer protocol session identifier in the Cookie, or a hypertext transfer protocol session identifier disposed behind a URL address.

In a further embodiment of the present invention, the application is Software As a Service application.

In each above embodiment of the system according to the present invention, the concrete operations of the session manager 501 and the session agent 502 may refer to the above description of the method of the present invention in conjunction with FIG. 2 to FIG. 4.

With the system provided by the present invention, it is possible to guarantee the correctness of data, avoid confusion caused in the prior art, and besides, the system is transparent to users, thereby brings better user experience and satisfy business needs in a better way.

Figure 6:
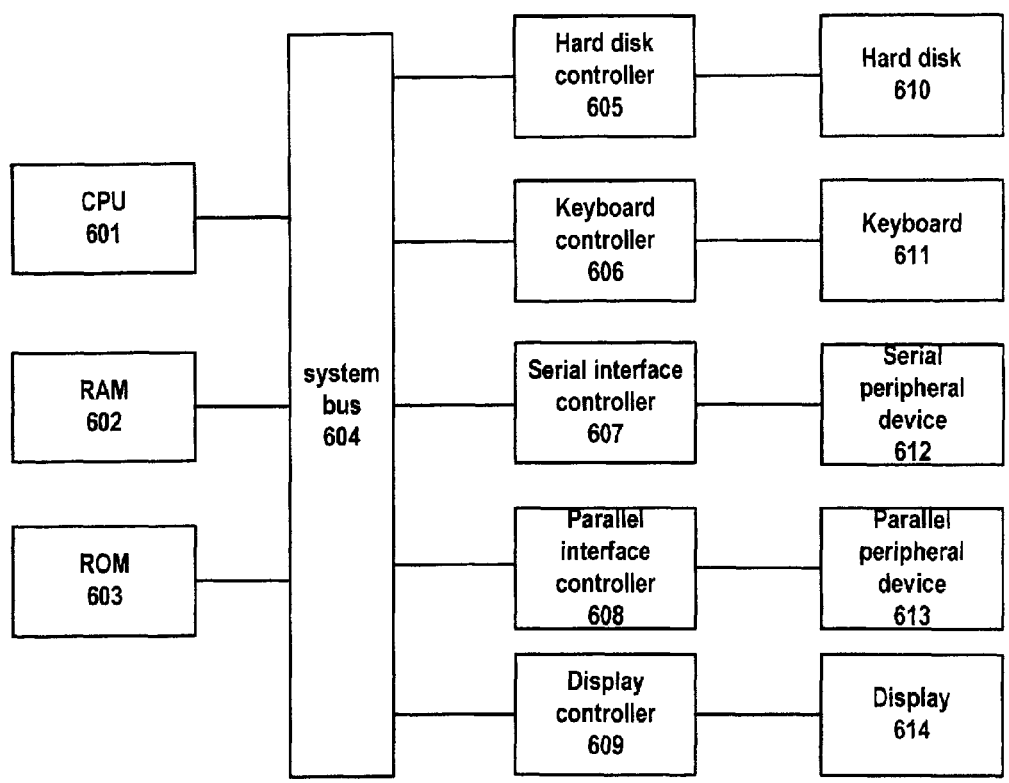
FIG. 6 exemplarily shows a structural block diagram of a computing device in which the embodiments according to the present invention can be implemented.

Referring to FIG. 6, a computer device in which the present invention can be implemented is described. FIG. 6 schematically shows a structural block diagram of a computing device configured to implement the embodiments according to the present invention.

The computer system as shown in FIG. 6 includes a CPU (Central Processing Unit) 601, a RAM (Random Access Memory) 602, a ROM (Read Only Memory) 603, a system bus 604, a hard disk controller 605, a keyboard controller 606, a serial interface controller 607, a parallel interface controller 608, a display controller 609, a hard disk 610, a keyboard 611, a serial peripheral device 612, a parallel peripheral device 613 and a display 614. Among these components, connected to the system bus 604 are the CPU 601, the RAM 602, the ROM 603, hard disk controller 605, the keyboard controller 606, the serial interface controller 607, the parallel controller 608 and the display controller 609. The hard disk 610 is connected with the hard Disk controller 605; the keyboard 611 is connected with the keyboard controller 606; the serial external device 612 is connected with the serial interface controller 607; the parallel external device 613 is connected with the parallel interface controller 608; and the display 614 is connected with the display controller 609.

The structural block diagram in FIG. 6 is shown only for illustration purpose, and is not intended to limit the present invention. In some cases, some devices can be added or reduced as required.

Further, the embodiments of the present invention can be implemented in software, hardware, or the combination thereof. The hardware part can be implemented by a special logic; the software part can be stored in a memory and executed by a proper instruction execution system such as a microprocessor or a dedicated designed hardware.

While the present invention has been described with reference to preferred embodiments, it should be understood that the present invention is not be limited to the embodiments disclosed herein. Modifications and equivalent arrangements that come within the spirit and range of the appended claims are intended to be embraced therein.

What is claimed is:

1. A method for separating hypertext transfer protocol (HTTP) sessions in a client-server data processing system, comprising:
    instantiating a first application on a client machine and storing a first HTTP session identifier associated with the first application for a current HTTP session on the client machine;
    detecting at the client machine a request to a server to instantiate a second application during the current HTTP session that is a new instance of the first application by determining the second application is to use the first HTTP session identifier;
    based on the second application being a new instance of the first application,
        requesting by the client machine to the server a second HTTP session by using a HTTP session identifier that is unidentifiable to the server, and
        obtaining by the client machine from the server a second HTTP session identifier; and
    setting, on the client machine, the second HTTP session identifier in the current HTTP session as a HTTP session identifier corresponding to a service instantiation for communication between the client machine and the server.

2. A method according to claim 1, wherein the obtaining step comprises:
    modifying the HTTP session identifier in the current session when it is requested to instantiate the second application such that the server generates the second HTTP session identifier.

3. A method according to claim 2, wherein the modifying step is implemented by deleting the HTTP session identifier in the current session.

4. A method according to claim 2, wherein the modifying step is implemented by replacing the HTTP session identifier in the current session with a value unidentifiable to the server.

5. A method according to claim 1, wherein the setting step comprises:
  detecting at the client a request to the server to instantiate a third application during the current HTTP session that is a new instance of the first application by determining the third application is to use the first HTTP session identifier;
  obtaining a third HTTP session identifier corresponding to the third application; and
  setting, on the client machine, the third HTTP session identifier in the current HTTP session a HTTP session identifier corresponding to a service instantiation for communication between the client machine and the server.

6. A method according to claim 1, wherein the HTTP session identifier in the current session is one of: (i) a HTTP session identifier in a Cookie and (ii) a HTTP session identifier disposed behind a URL address.

7. A method according to claim 1, wherein the application is a Software as a Service (SaaS) application.

8. A client system for separating hypertext transfer protocol session (HTTP) in a client-server data processing system, comprising:
  a memory;
  a processor communicatively coupled to the memory for performing;
  instantiating a first application on a client machine and storing a first HTTP session identifier associated with the first application for a current HTTP session on the client machine;
  detecting at the client machine a request to a server to instantiate a second application during the current HTTP session that is a new instance of the first application by determining the second application is to use the first HTTP session identifier;
  based on the second application being a new instance of the first application,
    requesting by the client machine to the server a second HTTP session by using a HTTP session identifier that is unidentifiable to the server, and
    obtaining by the client machine from the server a second HTTP session identifier; and
  setting, on the client machine, the second HTTP session identifier in the current HTTP session as a HTTP session identifier corresponding to a service instantiation for communication between the client machine and the server.

9. A system according to claim 8, wherein the obtaining comprises:
  modifying the HTTP session identifier in the current session when there is a request to instantiate the second application such that the server generates the second HTTP session identifier.

10. A system according to claim 9, wherein the modification is implemented by deleting the HTTP session identifier in the current session.

11. A system according to claim 9, wherein the modification is implemented by replacing the HTTP session identifier in the current session with a value unidentifiable to the server.

12. A system according to claim 8, wherein the HTTP session identifier in the current session is one of: a HTTP session identifier in a cookie and a HTTP session identifier disposed behind a URL address.

13. A system according to claim 8, wherein the setting comprises:
  detecting at the client a request to the server to instantiate a third application during the current HTTP session that is a new instance of the first application by determining the third application is to use the first HTTP session identifier;
  obtaining a third HTTP session identifier corresponding to the third application; and
  setting, on the client machine, the third HTTP session identifier in the current HTTP session as a HTTP session identifier corresponding to a service instantiation for communication between the client machine and the server.

* * * * *